US012662154B2

(12) United States Patent
Liu et al.

(10) Patent No.: US 12,662,154 B2
(45) Date of Patent: Jun. 23, 2026

(54) METHOD, APPARATUS AND NON-TRANSITORY COMPUTER-READABLE STORAGE MEDIUM FOR WARNING OF DANGEROUS DRIVING BEHAVIOR

(71) Applicant: Nanning FuLian FuGui Precision Industrial Co., Ltd., Nanning (CN)

(72) Inventors: Dong-Lin Liu, Nanning (CN); Ning Huang, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 40 days.

(21) Appl. No.: 19/001,732

(22) Filed: Dec. 26, 2024

(65) Prior Publication Data
US 2025/0353515 A1 Nov. 20, 2025

(30) Foreign Application Priority Data
May 14, 2024 (CN) .......................... 202410598983.7

(51) Int. Cl.
| | |
|---|---|
| *B60Q 1/00* | (2006.01) |
| *B60W 50/14* | (2020.01) |
| *G01S 17/89* | (2020.01) |
| *G01S 17/931* | (2020.01) |

(52) U.S. Cl.
CPC ............. *B60W 50/14* (2013.01); *G01S 17/89* (2013.01); *G01S 17/931* (2020.01); *B60W 2554/802* (2020.02)

(58) Field of Classification Search
CPC . B60W 50/14; B60W 2554/802; G01S 17/89; G01S 17/931; G01S 17/88; G06F 18/23; G06N 7/01

USPC .......................... 340/438, 439, 435, 436, 903
See application file for complete search history.

(56) References Cited

U.S. PATENT DOCUMENTS

| | | | |
|---|---|---|---|
| 10,902,336 B2 | 1/2021 | Lassoued et al. | |
| 11,410,389 B2 | 8/2022 | Shen | |
| 11,598,876 B2 * | 3/2023 | Zeng .................. | G01C 21/3837 |
| 11,820,387 B2 * | 11/2023 | Chaves .................. | H04W 4/40 |
| 2021/0148709 A1 * | 5/2021 | Kumar .................. | G01S 7/4802 |
| 2023/0184931 A1 * | 6/2023 | Wang ...................... | G01S 13/89 |
| | | | 342/52 |

FOREIGN PATENT DOCUMENTS

| | | |
|---|---|---|
| CN | 203332108 U | 12/2013 |
| CN | 111583609 A | 8/2020 |
| CN | 116385997 A | 7/2023 |
| CN | 117565882 A | 2/2024 |

* cited by examiner

*Primary Examiner* — Anh V La
(74) *Attorney, Agent, or Firm* — ScienBiziP, P.C.

(57) ABSTRACT

A method, apparatus and non-transitory computer-readable storage medium for warning of dangerous driving behavior, the method comprising: acquiring point cloud data collected by a LiDAR and dividing the point cloud data into ground point cloud data and non-ground point cloud data. Ground objects are identified based on the ground point cloud data, while non-ground objects are identified based on the non-ground point cloud data. Based on the motion changes of the vehicle relative to the ground objects and/or non-ground objects, it is determined whether the driver exhibits dangerous driving behavior, and real-time warnings are provided when dangerous driving behavior occurs.

10 Claims, 3 Drawing Sheets

METHOD, APPARATUS AND NON-TRANSITORY COMPUTER-READABLE STORAGE MEDIUM FOR WARNING OF DANGEROUS DRIVING BEHAVIOR

FIELD

A method, apparatus and non-transitory computer readable storage medium for warning of dangerous driving behavior.

BACKGROUND

While self-driving vehicles have made significant strides in improving road safety by leveraging advanced sensor technology, traditional vehicles continue to pose a significant risk due to the limitations of human judgment. Drivers of conventional vehicles often exhibit unsafe driving behaviors, such as sudden acceleration, hard braking, and lane drifting, particularly in challenging traffic conditions. These behaviors can lead to serious accidents and have a detrimental impact on overall road safety.

Therefore, there is a need to detect and prevent dangerous driving behavior in traditional vehicles.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
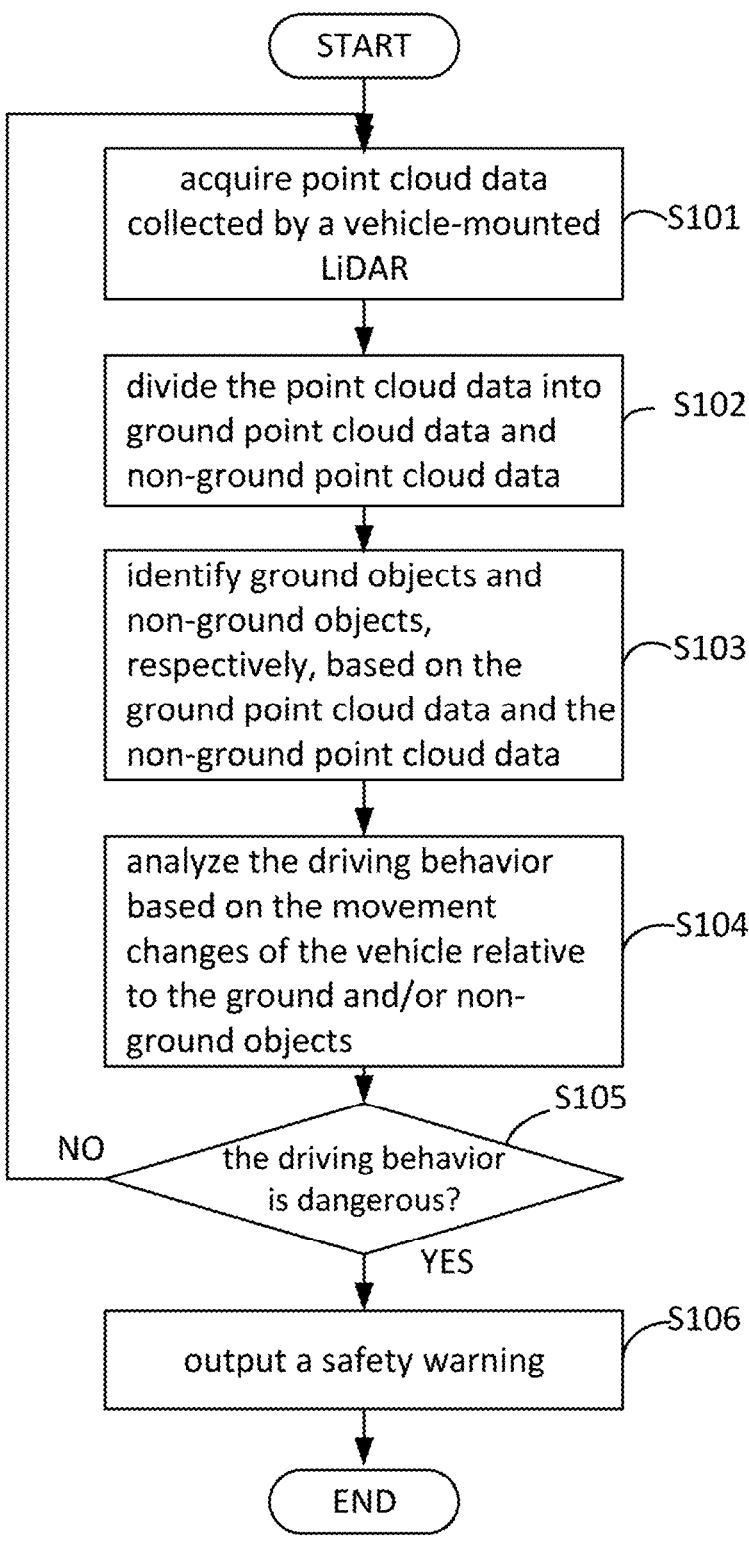
FIG. 1 is a flow chart of a method to warn dangerous driving behavior according to one embodiment of the present disclosure.

FIG. 1 is a flow chart of a method for warning of dangerous driving behavior. The method may be executed by a vehicle-mounted device. The vehicle-mounted device may be implemented in the form of software and/or hardware. Various steps in the flow of the method are described below.

Step S101, acquiring point cloud data collected by a vehicle-mounted LiDAR.

The vehicle-mounted LiDAR can be installed at the front, rear, or other positions of the vehicle to scan the surrounding environment of the vehicle using a laser and generate point cloud data. The point cloud data can be used to identify other vehicles, obstacles, pedestrians, trees, traffic signs, and other objects in the surrounding environment of the vehicle.

Step S102, dividing the point cloud data into ground point cloud data and non-ground point cloud data.

In this embodiment, in order to improve the computational efficiency of the subsequent target detection process and save computation time, the point cloud data is classified in advance.

In one example, the point cloud data can be converted from the point cloud coordinate system to the vehicle coordinate system, and the point cloud data after coordinate system conversion can be further divided into ground point cloud data and non-ground point cloud data. Specifically, a preset height threshold (z-coordinates) can be used as a distinguishing criterion. Any points in the point cloud data having heights less than the preset height threshold is classified into ground point cloud data and the other points in the point cloud data having heights greater than or equal to the preset height threshold is classified into non-ground point cloud data. For example, the preset height threshold can be 10 centimeters.

Step S103, identifying ground objects and non-ground objects, respectively, based on the ground point cloud data and the non-ground point cloud data.

In one example, a ground object detection model is used to process the ground point cloud data to obtain the identification result of ground objects. The ground objects include lane lines, speed limit signs, and lane direction, etc. The ground object detection model is a detection model trained based on ground point cloud sample data.

In one example, a non-ground object detection model is used to process the non-ground point cloud data to obtain the identification result of non-ground objects. The non-ground objects include cars, motorized vehicles, pedestrians, lampposts, etc. The non-ground object detection model is a detection model trained based on non-ground point cloud sample data.

For the non-ground object detection part, since the identification of general non-ground objects usually takes a long time, in one embodiment, a bird's eye view can be used to monitor the distances of the non-ground objects to improve the time efficiency of non-ground object identification and tracking.

Taking a vehicle-mounted LiDAR installed at the front end of the vehicle as an example, the original point cloud data collected by the vehicle-mounted LiDAR is not conducive to the detection of the non-ground objects. Therefore, firstly, the non-ground point cloud data is converted into a bird's eye view representation. Then, the bird's eye view representation is divided into equally sized unit grids, and each unit grid corresponds to an area above the ground. The point cloud data in each area is different due to different targets and the number of emission points. Each point data includes the distance, angle, height, and speed of the non-ground object relative to the vehicle. By clustering the gridded non-ground point cloud data using a clustering algorithm, the shape of the main non-ground object can be obtained, that is, the detection result of the non-ground object is obtained.

Based on the aforementioned steps, the non-ground objects can be further tracked.

Specifically, for the point cloud data corresponding to each non-ground object, the point cloud data closest to the vehicle can be extracted based on the distance to the vehicle, serving as the two-dimensional feature of the non-ground objects. Subsequently, the non-ground objects can be tracked based on distance monitoring using the two-dimensional feature. Since the distance of the same point relative to the vehicle changes with time during vehicle driving, when the distance of the point cloud data of the non-ground objects relative to the vehicle are less than or equal to the safe braking distance of the vehicle, the non-ground objects are continuously tracked; when the distances of the point cloud of the non-ground objects relative to the vehicle are greater than the safe braking distance of the vehicle, the tracking of the non-ground objects are stopped. The distance between the point cloud data and the vehicle can be calculated using the following formula: distance $$d = c \times T \times \frac{\Delta \emptyset}{4\pi},$$

where c is the speed of light, T is the laser radar pulse period, and $\Delta \emptyset$ is the phase difference between the emitted pulse and the reflected pulse. The change of distance d over time t is $$d(t) = c \times T \times \frac{\Delta \emptyset(t)}{4\pi},$$

and when d(t)>l, tracking is no longer performed. Here, l is the safe braking distance of the vehicle. The safe braking distance varies with the current speed of the vehicle. Studies have shown that the average driver's braking reaction time (including triggering, perception, judgment, releasing the accelerator, braking, and starting effective braking) is about 1.6 seconds. Based on this calculation, at a speed of 40 km/h, the stopping distance is 17.6 meters, at 50 km/h, it is 22.4 meters, and at 60 km/h, it is 27.2 meters. The safe braking distance can be based on the stopping distance plus a preset distance. In different embodiments, the safe braking distance can also be calculated by multiplying the current speed of the vehicle by 0.5. For example, the safe braking distance at a speed of 50 km/h is 25 meters, and at 60 km/h, it is 30 meters.

Step S104, analyzing the driving behavior based on the movement changes of the vehicle relative to the ground and/or non-ground objects.

Step S105, determining whether the driving behavior is dangerous.

If the driving behavior is determined to be dangerous, execute step S106; otherwise, return to step S101 to continue collecting point cloud data.

In this embodiment, the types of dangerous driving behaviors include driving in the reverse direction, driving off the designated road, failing to maintain a safe distance, improper reversing, improper meeting, improper overtaking, improper lane changing, continuous lane changing, and improper racing. The following is a specific description of the analysis and determination process of dangerous driving behavior.

Dangerous Driving Behavior Analysis (1): Driving in the Wrong Direction or not Following Designated Lanes:

Analyze whether the direction of the lane on the ground target object is opposite to the driving direction of the vehicle. When the direction of the vehicle on the ground target object is opposite to the driving direction of the vehicle, it is determined that the current driving behavior is driving in the wrong direction.

When the ground target object is a non-double solid lane line, analyze whether the driving directions of multiple other vehicles on the adjacent lane are opposite to the driving direction of the vehicle. When the driving directions of multiple other vehicles on the adjacent lane are opposite to the driving direction of the vehicle, it is determined that the current driving behavior is driving in the wrong direction.

Based on the lane lines on the ground target object, analyze whether the vehicle is driving within the designated lane. When the vehicle is not driving within the designated lane, it is determined that the current driving behavior is not following the designated lanes.

Dangerous Driving Behavior Analysis (2): Failing to Maintain a Safe Distance or Improper Reversing:

When there are other vehicles ahead on the non-ground target object, analyze whether the distance between the vehicle and the other vehicles ahead is greater than or equal to the safe braking distance. When the distance between the vehicle and the other vehicles ahead is not greater than or equal to the safe braking distance, it is determined that the current driving behavior is failing to maintain a safe distance.

Arbitrarily select a point on the lane line of the ground target object outside the safe braking distance for distance monitoring. When it is detected that the distance to this point is gradually increasing over time, it is determined that the current driving behavior is improper reversing.

Dangerous Driving Behavior Analysis (3): Improper Meeting or Overtaking:

Analyze whether the road width is gradually narrowing over time. Here, the road width is the distance between the lane lines on both sides of the vehicle. When the road width gradually narrows, and there are other vehicles in the safe braking distance storage in different driving directions, and the vehicle does not change its driving direction, it is determined that the current driving behavior is improper meeting.

Monitor the distance to the other vehicles ahead. When it is detected that the distance to the other vehicles is less than the safe braking distance, and the vehicle changes lanes, it is determined that the current driving behavior is improper overtaking. Here, when different lane lines appear on the ground target object within the default time and the driving direction of the vehicle does not change, it is determined that the vehicle has changed lanes.

Dangerous Driving Behavior Analysis (4): Improper Lane Changing, Continuous Lane Changing, or Improper Racing:

When it is analyzed that the vehicle has changed lanes and crossed the solid lane line, it is determined that the current driving behavior is improper lane changing.

When it is analyzed that the vehicle has repeatedly changed lanes, it is determined that the current driving behavior is continuous lane changing.

Based on the current speed of the vehicle and the current speed of other surrounding vehicles, it is determined whether there is a mutual acceleration behavior. When the current speed of the vehicle and the speed of other surrounding vehicles are both greater than the default speed threshold, it is determined that the current driving behavior is improper racing. Here, the speed of other surrounding vehicles can be obtained by calculating the current speed of the vehicle and the speed of other surrounding vehicles relative to the vehicle.

Step S106, outputting a safety warning.

The safety warning provides a safety alert to the driver. The safety warning can include voice prompts, flashing lights, etc., enabling the driver to understand that their driving behavior constitutes dangerous driving and reminding them to pay attention to driving safety. In different embodiments, the safety warning can also be sent to the driver's emergency contact or relevant traffic authorities.

In one embodiment, the occurrence and frequency of dangerous driving behaviors can be used to determine whether the driver has road rage.

Road rage is a symptom of emotional loss of control. It is common for drivers to experience anger, provocation, and reproach when encountering traffic jams or other improper driving behaviors while driving. Drivers with road rage are very likely to deliberately drive in an unsafe or threatening manner, and in severe cases, may even affect traffic safety. If drivers cannot cope with road rage on their own, they can seek professional support, such as psychological counseling or therapy, to reduce the likelihood of road rage.

Since drivers with road rage have a very high probability of engaging in the aforementioned dangerous driving behaviors, the types, frequency, and/or frequency of occurrence of dangerous driving behaviors can be statistically analyzed to predict whether a driver has road rage. Therefore, when it is predicted that a driver may have road rage, a timely warning can be issued to increase driving safety.

Figure 2:
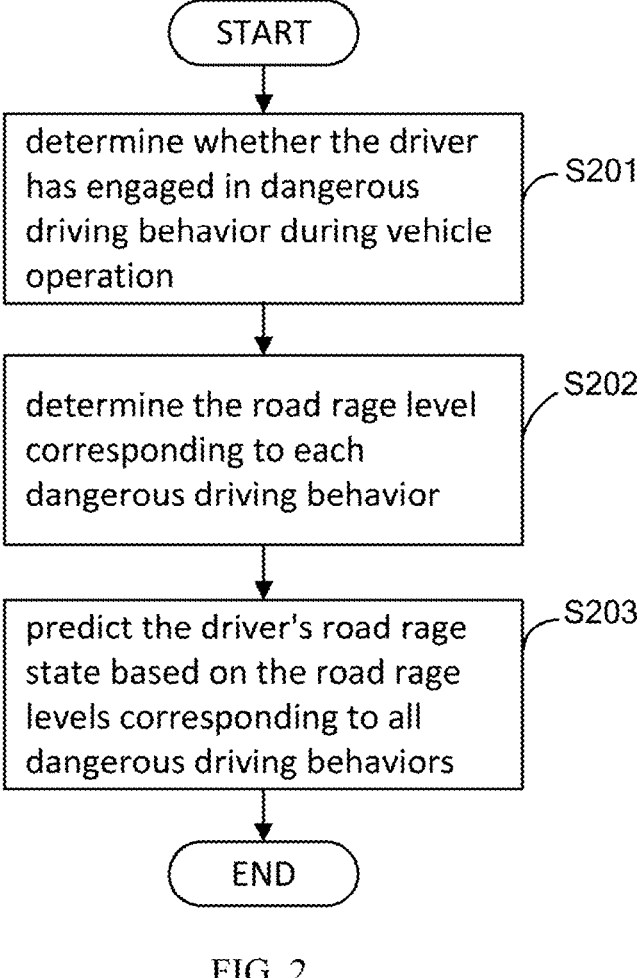
FIG. 2 is flow chart of a method to detect a road rage behavior of a driver according to one embodiment of the present disclosure.

FIG. 2 is a flow chart of a driving method for predicting driver road rage.

Step S201, determining whether the driver has engaged in dangerous driving behavior during vehicle operation.

In one embodiment, step S201 can be implemented as follows: in steps S104 and S105, when it is analyzed that the driving behavior is dangerous driving behavior, the type of dangerous driving behavior is recorded, and the occurrence frequency of the dangerous driving behavior is accumulated as the driving behavior record of the driver. Based on the driving behavior record of the driver, it is determined whether the driver has engaged in dangerous driving behavior during vehicle operation.

In one embodiment, the driver's road rage can be predicted periodically after each vehicle startup. The driving behavior record can be recorded after each vehicle startup or continuously recorded and stored as historical data.

Step S202, when it is determined that there is at least one dangerous driving behavior, determining the road rage level corresponding to each dangerous driving behavior. Here, the road rage level is used to indicate the possibility of the driver having road rage.

It can be understood that during the vehicle operation after the vehicle is started, it is possible that the driver does not have any dangerous driving behavior. In this case, it can be determined that the driver does not have the possibility of road rage. In the case where a dangerous driving behavior has occurred during vehicle operation, the number of dangerous driving behaviors may be one or more.

In one embodiment, the road rage level corresponding to different types of dangerous driving behaviors can be preset according to the degree of harm to traffic safety of the types of dangerous driving behaviors. Thus, when it is determined that the driver has at least one dangerous driving behavior, for each dangerous driving behavior, the road rage level corresponding to the type of dangerous driving behavior can be queried according to the type of dangerous driving behavior to determine the road rage level corresponding to the dangerous driving behavior. For example, a road rage level of "1" indicates that the driver is extremely unlikely to have road rage, and a road rage level of "10" indicates that the driver is extremely likely to have road rage, with road rage levels represented by numbers from 1 to 10. The road rage level for illegal reversing can be set to "1", and the road rage level for failing to maintain a safe distance can be set to "10".

In different embodiments, the severity corresponding to different types of dangerous driving behaviors can be preset according to the degree of harm to traffic safety of the types of dangerous driving behaviors. At the same time, the occurrence frequency of different types of dangerous driving behaviors is counted. The road rage level corresponding to a dangerous driving behavior is calculated based on the type of dangerous driving behavior, the occurrence frequency, and the severity. For example, a severity of "1" means not serious, and a severity of "10" means very serious; the severity of illegal reversing is preset to "1", and the severity of failing to maintain a safe distance is preset to "10". The accumulated number of occurrences of illegal reversing is "0", and the accumulated number of occurrences of failing to maintain a safe distance is "8". The road rage level corresponding to the type of dangerous driving behavior can be expressed by multiplying the severity corresponding to the type of dangerous driving behavior by the number of occurrences of the type of dangerous driving behavior. That is, the road rage level of illegal reversing is $1 \times 0 = 0$, and the road rage level of failing to maintain a safe distance is $10 \times 8 = 80$.

In different embodiments, the road rage level corresponding to each dangerous driving behavior can also be set or calculated based on other parameters. For example, the road rage level corresponding to a dangerous driving behavior can be calculated based on the number of occurrences, occurrence frequency, severity, and ease of detecting the dangerous driving behavior.

Step S203, predicting the driver's road rage state based on the road rage levels corresponding to all dangerous driving behaviors.

Specifically, the road rage level corresponding to the dangerous driving behavior is taken as the observation value and input into the trained Hidden Markov Model (HMM) to obtain the road rage state prediction output by the HMM. Based on the road rage state prediction, the future road rage state of the driver at a future time during vehicle operation is predicted. Here, the future time is any time within a time period after the current time.

The predicted road rage state output by the Hidden Markov Model (HMM) represents the driver's current or future road rage condition as determined by the model.

In one embodiment, the Viterbi algorithm, a dynamic programming algorithm associated with the HMM, can be employed to estimate the driver's current road rage state. The HMM utilizes fundamental statistical tools to attempt to recover the state sequence that generated a given observation sequence.

In this embodiment, the driver's changing road rage state, composed of several road rage states and transition probabilities, is a Markov chain with the Markov property. The driver's dangerous driving behaviors form a stochastic process. Each dangerous driving behavior has a certain impact on the transition of the driver's road rage state, and different levels of dangerous driving behaviors have different impacts. Thus, the sequence of road rage levels corresponding to each dangerous driving behavior and the driver's road rage state constitute a Hidden Markov Model.

As can be understood, a Hidden Markov Model consists of hidden states, observable states, and a trigram.

Hidden states can include multiple preset road rage states, and different road rage states correspond to different levels of road rage. For example, preset road rage states can include mild, moderate, and severe road rage, with increasing severity. That is $S = \{L, M, H\}$, S represents the set of hidden states, L represents mild road rage, M represents moderate road rage, and H represents severe road rage. Assuming the driver's road rage state at time t is qt, then qt E S, and the driver's road rage states at multiple time points form a road rage state sequence.

Observable states can include multiple observations, and each observation is a default road rage level. The default road rage level can be a preset road rage level for the threat event type of each dangerous driving behavior, i.e., $V = \{v1,$ v2, . . . , vN}, where V represents the set of observable states, or the set of observations, and vN represents the Nth observation, where N is an integer greater than 1. Assuming the road rage level corresponding to the type of dangerous driving behavior that the driver performs at time t is ot, then ot∈V, and the road rage levels corresponding to the types of dangerous driving behaviors that the driver performs at multiple time points form an observation sequence.

π is the initial state probability matrix, including the distribution probability of each preset road rage state at the initial moment, A is the state transition probability matrix, including the probability of transition between each preset road rage state, and B is the observation probability matrix, including the probability of generating each road rage level under the condition of being in each preset road rage state at any time. For example, the element in the jth column of the initial state probability matrix represents the probability of being in the jth preset road rage state at the initial moment. The element in the ith row and jth column of the state transition probability matrix represents the probability of transitioning to the jth preset road rage state at the next moment under the condition of being in the ith preset road rage state at the current moment. The element in the ith row and jth column of the observation probability matrix represents the probability of generating the jth road rage level under the condition of being in the ith preset road rage state at any time.

π and A determine the road rage state sequence, and B determines the observation sequence. Therefore, the Hidden Markov Model can be represented by a trigram, and π, A, and B are called the three elements of the Hidden Markov Model.

In an embodiment, the parameters π, A, and B of the trigram can be estimated through the forward-backward (Baum-Welch) algorithm in the related technology to realize the learning of the Hidden Markov Model. Furthermore, the learned Hidden Markov Model can be used to predict the driver's road rage state.

By inputting the road rage level corresponding to the type of at least one dangerous driving behavior performed by the driver during vehicle driving as an observation value into the Hidden Markov Model, the Hidden Markov Model can output at least one predicted road rage state, and thus the driver's road rage state can be predicted through the Hidden Markov Model. The number of road rage states of the driver can be the same as the number of dangerous driving behaviors that occur during vehicle driving. When there is only one dangerous driving behavior that occurs during vehicle driving, the road rage level corresponding to the type of this dangerous driving behavior can be used as an observation value, and the Hidden Markov Model can output one predicted road rage state. When there are multiple dangerous driving behaviors that occur during vehicle driving, the road rage levels corresponding to the types of multiple dangerous driving behaviors can be used as multiple observation values, and the multiple observation values can form an observation sequence, which is input into the Hidden Markov Model, so that the Hidden Markov Model can output a road rage state sequence, and the road rage state sequence includes multiple predicted road rage states.

In one embodiment, based on the predicted road rage state output by the Hidden Markov Model and the number of predicted road rage states, i.e., the number of dangerous driving behaviors that occur during vehicle driving, the future road rage state of the driver at a future moment during vehicle driving can be predicted.

For example, when there are multiple dangerous driving behaviors performed by the driver, the number of predicted road rage states output by the Hidden Markov Model is also multiple, and the predicted road rage state with the highest occurrence or the highest probability can be determined as the future road rage state.

It can be understood that the driver may not have any dangerous driving behavior during vehicle driving. In this case, it can be determined that the driver does not have road rage.

In one embodiment, according to the driver's road rage state, different levels of warnings can be provided to ensure that the driver can receive real-time alerts and correct their own driving behavior. The different levels of warnings include, for example, voice warnings, visual warnings, and a combination of voice and visual warnings. In this embodiment, the implementation method of the warning is not limited.

Figure 3:
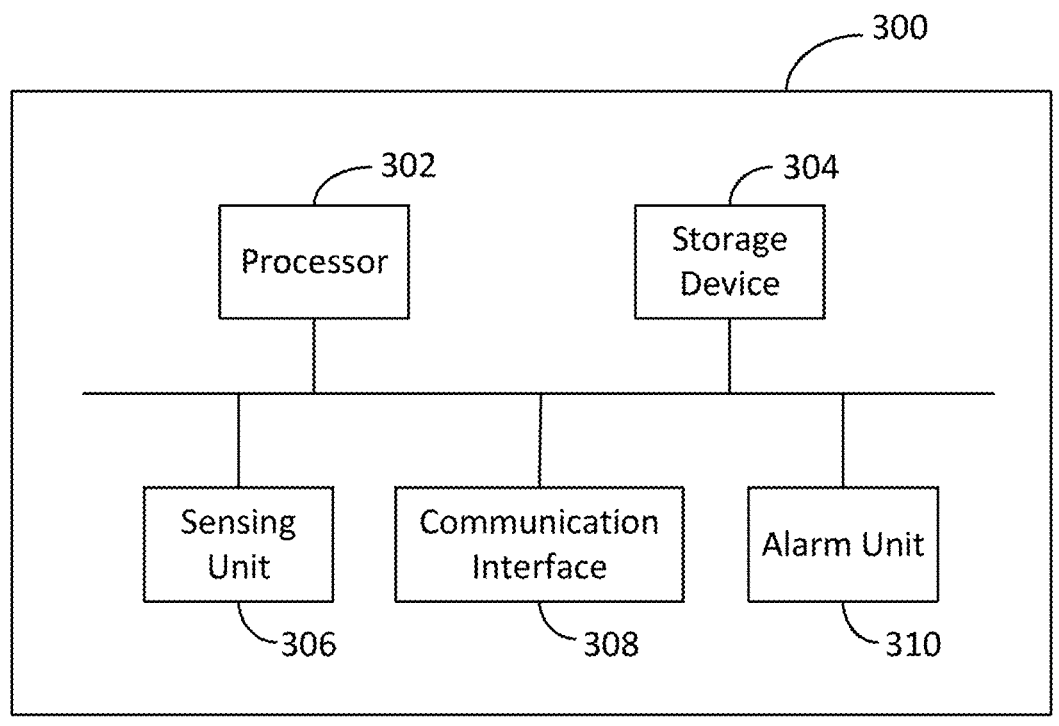
FIG. 3 is block diagram of an apparatus for warning of dangerous driving behavior according to one embodiment of the present disclosure.

FIG. 3 is a block diagram of an apparatus 300 for warning of dangerous driving behavior. The apparatus 300 includes a processor 302, a storage device 304, a sensing unit 306, a communication interface 308, and an alarm unit 310. The composition of the apparatus 300 shown in FIG. 3 does not constitute a limitation of the embodiments of the present invention. The apparatus 300 shown in FIG. 3 is simplified for the sake of description. In different embodiments, the apparatus 300 may include fewer or more components than those shown.

In one embodiment, the processor 302 may be composed of an integrated circuit, such as a single-package integrated circuit, or may be composed of multiple integrated circuits packaged with the same or different functions, including one or more central processing units (CPUs), microprocessors, digital signal processors, graphics processors, and various control chips. The processor 302 is the control core (Control Unit) of the apparatus 300, which connects various parts of the apparatus 300 through various interfaces and lines. By running or executing computer programs or modules stored in the storage device 304 and calling data stored in the storage device 304, the processor 302 performs various functions of the apparatus 300 and processes data, such as a dangerous driving behavior warning method.

In one embodiment, the storage device 304 is used to store computer program codes and various data, such as a dangerous driving behavior warning method, and realizes high-speed and automatic access to programs or data during the operation of the apparatus 300. The storage device 304 includes a read-only memory (ROM), a programmable read-only memory (PROM), an erasable programmable read-only memory (EPROM), a one-time programmable read-only memory (OTPROM), an electrically erasable programmable read-only memory (EEPROM), a compact disc read-only memory (CD-ROM) or other optical disk storage, a disk storage, a tape storage, or any other computer-readable storage medium capable of carrying or storing data.

In one embodiment, the sensing unit 306 includes a plurality of sensors for sensing environmental information around the vehicle. For example, the sensing unit 306 may include a positioning system, an inertial measurement unit, a LiDAR, and a camera. The sensing unit 306 may also include sensors for monitoring the vehicle's internal systems, such as an in-vehicle air quality monitor, a fuel gauge, and an oil temperature gauge. In different embodiments, the different sensors in the sensing unit 306 may be different and independent devices that are connected to the apparatus 300 via wireless or wired communication. Among them, the LiDAR can use laser as a medium to detect objects based on the TOF method or the phase shift method, and detect the position of the detected object as well as the distance and relative speed of the detected object.

In one embodiment, the communication interface 308 is composed of a communication circuit for communicating data or information with external devices.

In one embodiment, the alarm unit 310 includes a unit for providing visual or auditory warnings. The visual warning includes a light warning, and the auditory warning includes a voice warning or a specific audio warning. In different examples, the alarm unit 310 can also provide both sound and light warnings.

In summary, the dangerous driving behavior warning method, apparatus, and computer-readable storage medium of the present invention can be used to detect dangerous driving behavior of a driver and provide a real-time warning. At the same time, the future state of the driver's road rage can be predicted based on the type of the driver's dangerous driving behavior.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method to warn dangerous driving behaviors, the method is applied on an electronic apparatus, the method comprising:
    acquiring point cloud data collected by a lidar of a vehicle;
    dividing the point cloud data into ground point cloud data and non-ground point cloud data;
    identifying ground objects and non-ground objects based on the ground point cloud data and the non-ground point cloud data;
    analyzing driving behaviors of a driver of the vehicle based on movement changes of the vehicle relative to the ground objects and the non-ground objects;
    determining whether the driving behaviors of the driver comprises at least one dangerous driving behavior; and
    outputting a safety warning when the driving behaviors of the driver is determined to comprise the dangerous driving behavior.

2. The method of claim 1, wherein the at least one dangerous driving behavior comprises driving in reverse and failing to maintain a safe distance.

3. The method of claim 1, wherein the dividing the point cloud data into ground point cloud data and non-ground point cloud data comprises:
    converting the point cloud data from a point cloud coordinate system to a coordinate system of the vehicle;
    classifying point data in the point cloud data with height values less than a preset height threshold as the ground point cloud data; and
    classifying point data in the point cloud data with height values greater or equal to the preset height threshold as the non-ground point cloud data.

4. The method of claim 1, further comprising:
    converting the non-ground point cloud data into a bird's-eye view representation;
    dividing the bird's-eye view representation into equally sized unit grids, with each unit grid corresponding to an area above a ground surface;

clustering gridded non-ground point cloud data using a clustering algorithm to obtain shapes of the non-ground objects;
    extracting point data closest to the vehicle from each non-ground object as two-dimensional feature of each non-ground object according to a distance between each non-ground object and the vehicle; and
    tracking each non-ground object whose distance relative to the vehicle is less than or equal to a safe braking distance of the vehicle according to the two-dimensional feature of each non-ground object.

5. The method of claim 2, wherein the determining whether the driving behaviors of the driver comprises at least one dangerous driving behavior comprises:
    analyzing whether directions of lanes of the ground objects are opposite to the driving direction of the vehicle;
    determining that the driving behavior is the driving in reverse among the at least one dangerous driving behavior when the directions of lanes of the ground objects are opposite to the driving direction of the vehicle.

6. The method of claim 2, wherein the determining whether the determining whether the driving behaviors of the driver comprises at least one dangerous driving behavior comprises:
    analyzing whether driving directions of a plurality of other vehicles around the vehicle in the adjacent lane are opposite to the driving direction of the vehicle when there is a non-double solid line in a lane of the ground objects; and
    determining that the driving behavior is the driving in reverse among the dangerous driving behavior when the driving directions of the plurality of the other vehicles are opposite to the driving direction of the vehicle.

7. The method of claim 2, wherein the determining whether the driving behaviors of the driver comprises at least one dangerous driving behavior comprises:
    analyzing whether distances between the vehicle and the other vehicles around the vehicle are greater than or equal to a safe braking distance when there are other vehicles in front of the non-ground objects;
    determining that the driving behavior is the failing to maintain the safe distance among the dangerous driving behavior when the distances between the vehicle and the other vehicles are not greater than or equal to the safe braking distance.

8. The method of claim 1 further comprising:
    determining whether the driver has a record of the at least one dangerous driving behavior in a history of driving of the vehicle;
    when the driver is determined to has the record of the at least one of the dangerous driving behavior, determining a road rage level corresponding to each of the at least one dangerous driving behavior, wherein the road rage level indicates a possibility that the driver has a road rage; and
    predicting a road rage state of the driver based on the road rage levels corresponding to the at least one dangerous driving behaviors.

9. An apparatus configured for warning of dangerous driving behavior, the apparatus comprising:
    a non-transitory memory storage storing processor-executable instructions; and at least one processor coupled to the memory to receive the processor-executable instructions, wherein, upon execution of the processor executable instructions, the at least one processor:

acquiring point cloud data collected by a lidar of a vehicle;

dividing the point cloud data into ground point cloud data and non-ground point cloud data;

identifying ground objects and non-ground objects based on the ground point cloud data and the non-ground point cloud data;

analyzing driving behaviors of a driver of the vehicle based on movement changes of the vehicle relative to the ground objects and the non-ground objects;

determining whether the driving behaviors of the driver comprises at least one dangerous driving behavior; and outputting a safety warning when the driving behaviors of the driver is determined to comprise the dangerous driving behavior.

10. A non-transitory computer readable storage medium storing processor-executable instructions which, when executed by at least one processor, cause the at least one processor to perform a method for warning of dangerous driving behavior, the method comprising:

acquiring point cloud data collected by a lidar of a vehicle;

dividing the point cloud data into ground point cloud data and non-ground point cloud data;

identifying ground objects and non-ground objects based on the ground point cloud data and the non-ground point cloud data;

analyzing driving behaviors of a driver of the vehicle based on movement changes of the vehicle relative to the ground objects and the non-ground objects;

determining whether the driving behaviors of the driver comprises at least one dangerous driving behavior; and outputting a safety warning when the driving behaviors of the driver is determined to comprise the dangerous driving behavior.

\*    \*    \*    \*    \*